Figure 1:
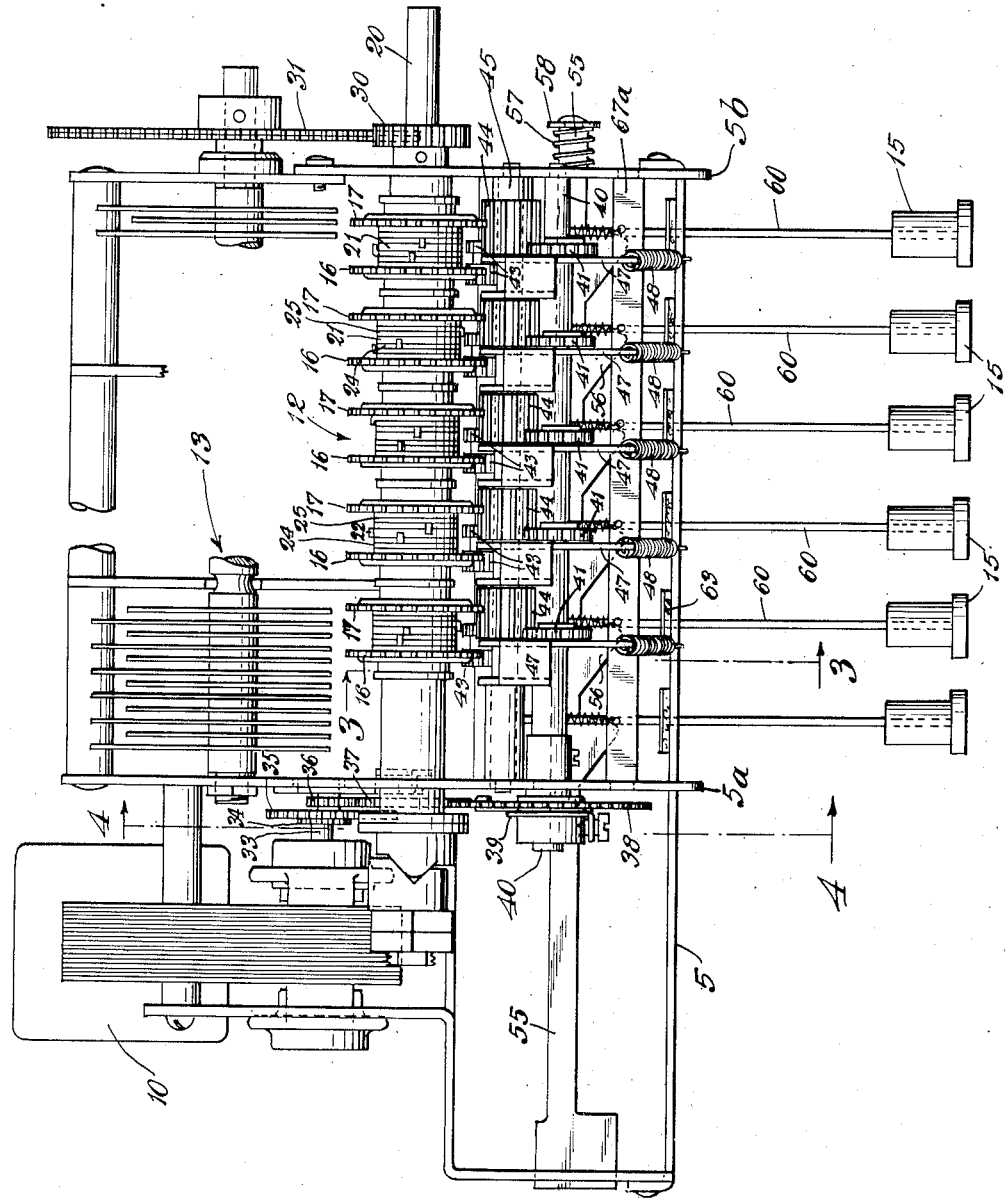

May 3, 1949.　　　　E. J. MASTNEY ET AL　　　　2,469,170
CONTROL APPARATUS FOR TUNERS

Filed Dec. 10, 1945　　　　　　　　　　5 Sheets-Sheet 1

Inventors
Edward J. Mastney,
John H. Williams
by Robert L. Kahn
Attorney

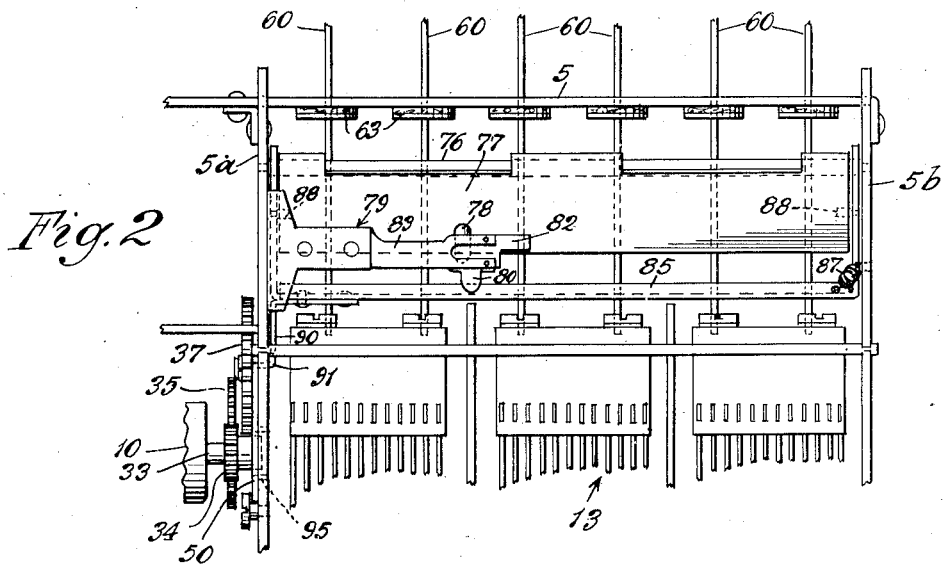
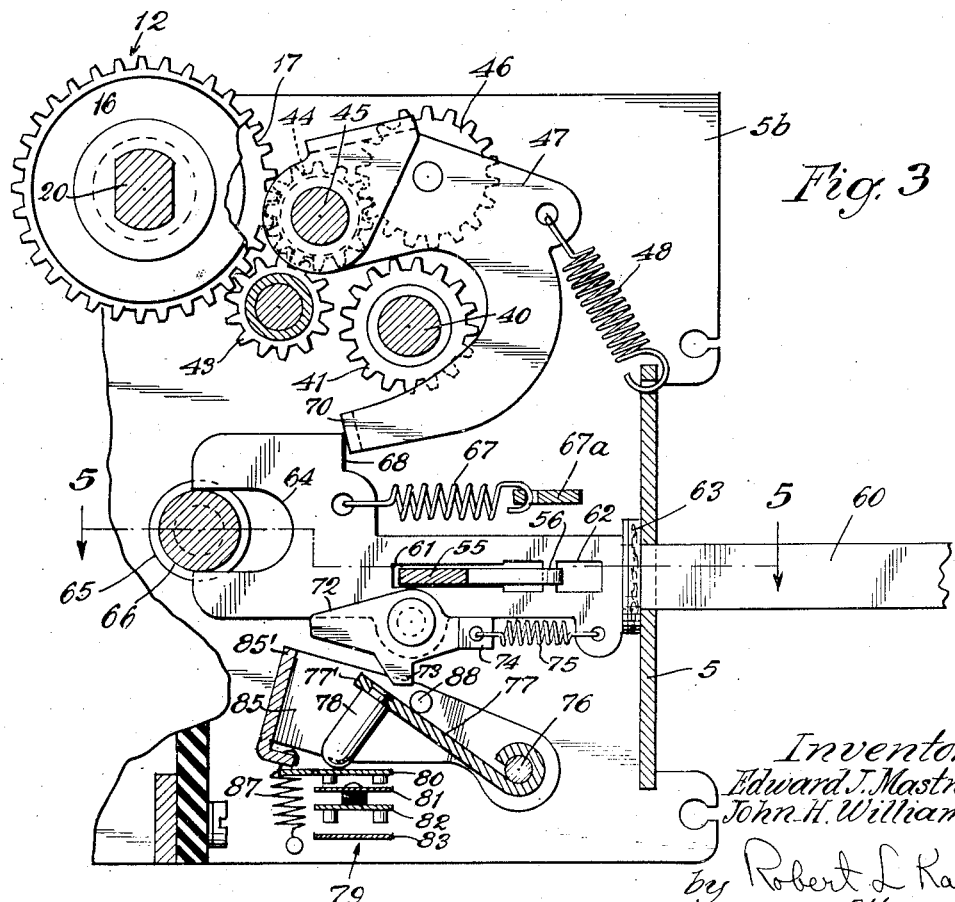

May 3, 1949.  E. J. MASTNEY ET AL  2,469,170
CONTROL APPARATUS FOR TUNERS
Filed Dec. 10, 1945  5 Sheets-Sheet 4

Inventors
Edward J. Mastney
John H. Williams
by Robert L. Kahn
Attorney

May 3, 1949.　　　E. J. MASTNEY ET AL　　　2,469,170
CONTROL APPARATUS FOR TUNERS
Filed Dec. 10, 1945　　　　　　　　　　　　5 Sheets-Sheet 5
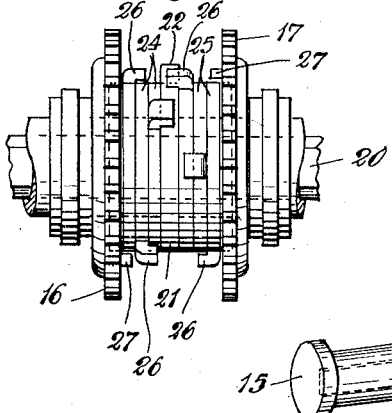
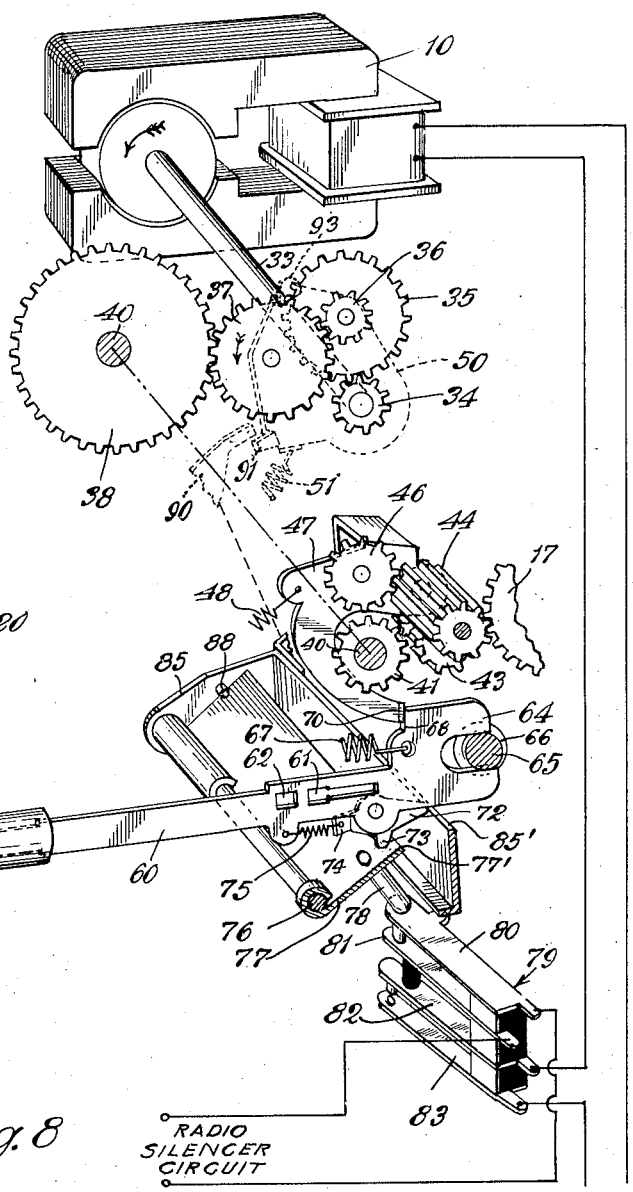
Inventors
Edward J. Mastney
John H. Williams
by Robert L. Kahn
Attorney Patented May 3, 1949

2,469,170

UNITED STATES PATENT OFFICE 2,469,170

CONTROL APPARATUS FOR TUNERS

Edward J. Mastney, Berwyn, and John H. Williams, Chicago, Ill., assignors to Oak Mfg. Co., Chicago, Ill., a corporation of Illinois Application December 10, 1945, Serial No. 633,992

8 Claims. (Cl. 192—150)

This invention relates to an electrical apparatus and particularly to a tuner of the general type disclosed in Patent 2,293,299, granted August 18, 1942. In this patent, a preselecting mechanism is shown wherein a shaft to be indexed is operated upon by gears turning in opposite directions at equal speeds. When the preselected home position has been reached, the entire mechanism becomes locked and the driving motor stalls.

Inasmuch as a driving motor for tuners of this character operates for short periods of time, it is the practice to operate the motor under overload conditions. To prevent damage to the motor, it is essential that the motor circuit be opened promptly when the preselected home position has been reached.

An apparatus having a tuning mechanism as described above generally has a plurality of preselector units operated from the same motor and operating on the same device such as a tuning condenser. As a rule, a gear which may be moved in or out of mesh with other gears provides a power connection between the motor and one preselector unit. In order that the mechanism may be in a condition to operate at any time, it is essential that the driving connection between the motor and any one preselection unit assume a position of disengagement.

In many types of apparatus, such as radio receivers, a plurality of preselector units are provided, each one of which may be controlled by a button or knob. It is desirable to provide means for retaining a knob or button in an off-normal position to indicate that that particular button or knob has been operated. Means for retaining a push-button or knob in an off-normal position when operated while permitting the return of a previously-operated push-button or knob are well known. Thus, Patent 2,213,845 shows such a means in connection with electric switches.

In order to adapt a push-button mechanism, such as commonly used in connection with radio apparatus, for use with a power-driven tuner, as disclosed in Patent 2,293,299 above referred to, it is necessary to take into account certain conditions. Thus, it is desirable to provide means for opening the switch controlling the motor circuit and permitting gear disengagement. When the motor-driven tuner has come to a home position, it is desirable that the push-button mechanism itself be generally unaffected. On the other hand, upon operation of a push-button to select a home position, it is desirable to close the motor circuit and permit engagement of the power drive.

In accordance with the invention, a simple and effective means is provided whereby a push-button mechanism is associated with a motor-driven tuner to provide a simple, compact and effective tuner. The invention further provides a simple means for cutting off the circuit to the motor when the mechanism has reached a home position.

For a fuller understanding of the invention, reference will now be made to the drawings.

Figure 4:
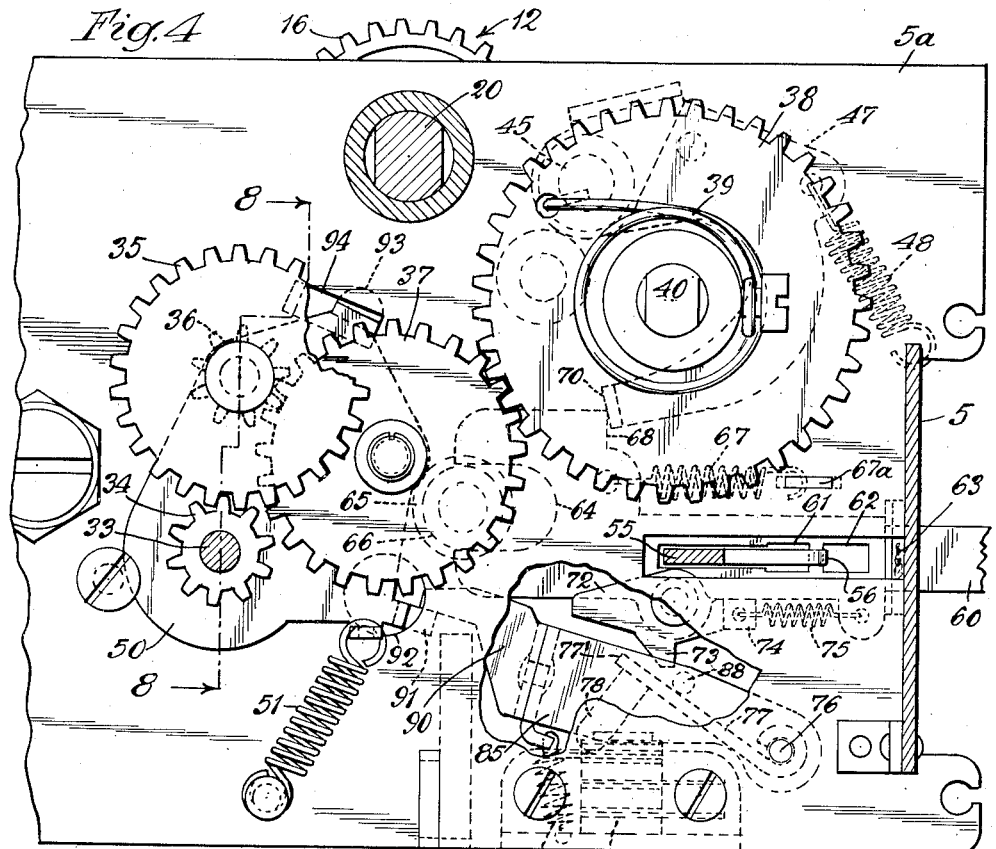
Figure 5:
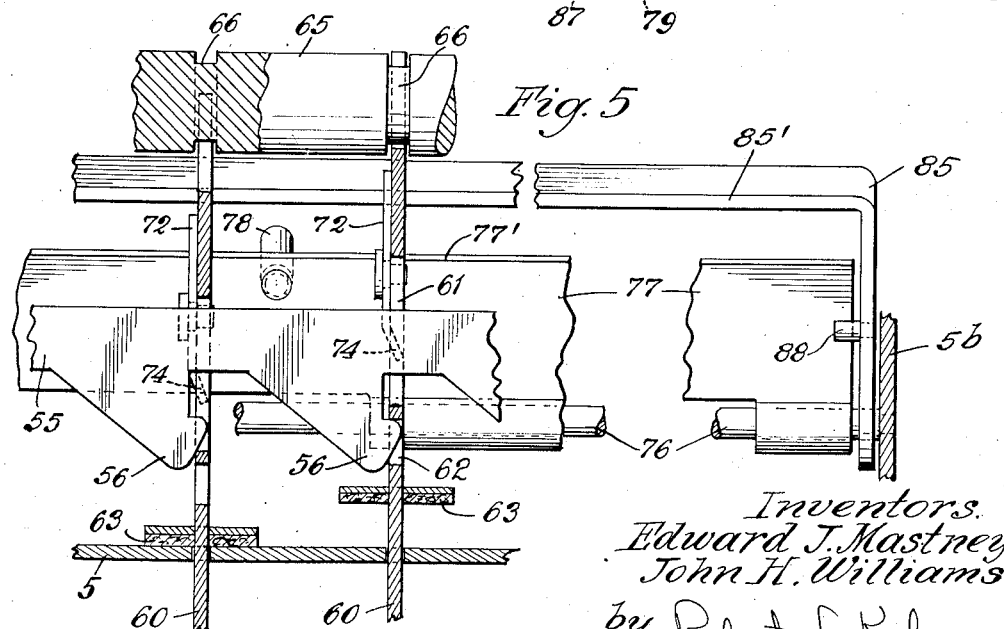
Figure 7:
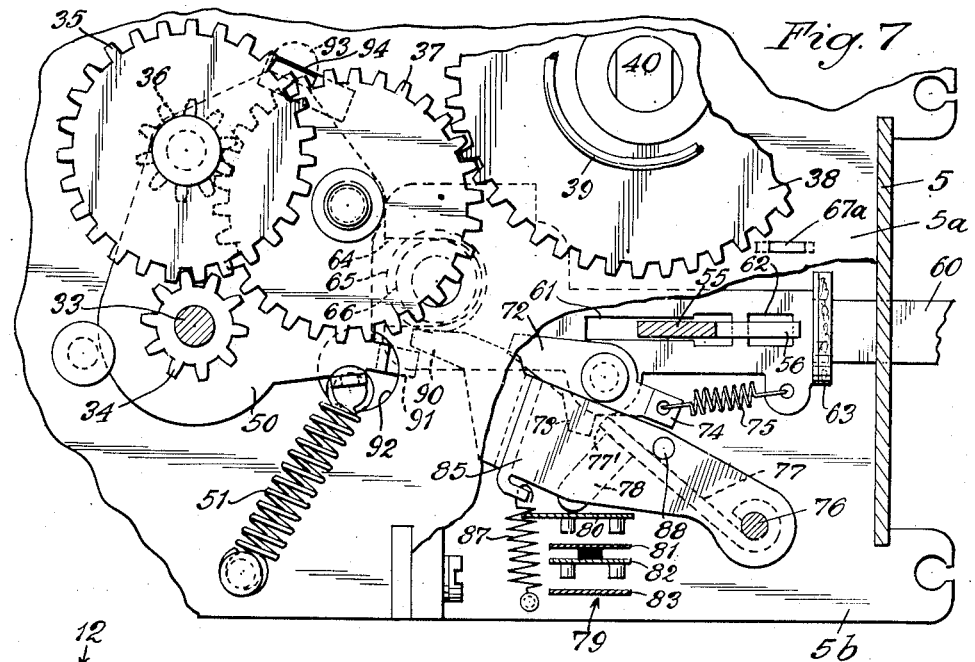
Figure 6:
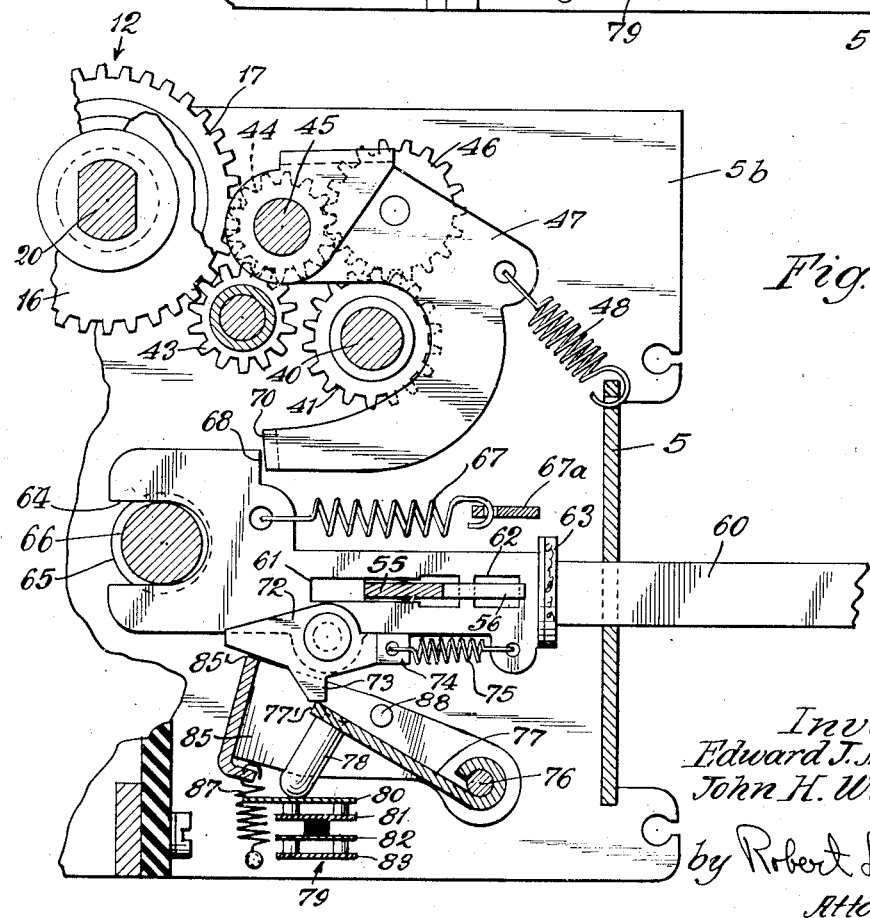

Figure 1 is a plan view looking down on the top with certain parts broken away of a structure embodying the present invention. Figure 2 is a plan view from the bottom of the structure shown in Figure 1 with certain parts broken away. Figure 3 is a section along broken line 3—3 of Figure 1 and showing the structure in a rest position with all push-rods in a normal off position. Figure 4 is a section along line 4—4 of Figure 1. Figure 5 is a sectional detail with certain parts broken away along broken line 5—5 of Figure 3 but with one push-rod shown in an on position. Figure 6 is a view similar to Figure 3 but showing the condition of the apparatus with a push-rod in an on position and the mechanism just reaching a home position and just prior to opening of the switches. Figure 7 is a view generally similar to Figure 4 but showing the condition of the mechanism after reaching a home position and opening the switches. Figure 8 is a detail partly in section along broken line 8—8 of Figure 4. Figure 9 is an exploded isometric view, partly diagrammatic, showing the gear drive and rocker structure. Figure 10 is a detail showing one preselector unit.

Referring first to Figures 1 and 2, the entire apparatus is mounted upon an irregular frame 5 including side plates 5a and 5b. Motor 10 is provided and, when energized, furnishes power for a plurality of preselector units, generally indicated as 12. Each preselector unit may be operated to determine a preselected home position for any device 13, here generally indicated as a gang condenser. The choice of preselector unit to be operated may be made by operating one of a number of push-buttons 15 cooperating with suitable locking mechanism to be described in detail later. For convenience, the apparatus will be oriented to have push-buttons 15 in front and preselector units 12 at the top.

In general, each preselector unit includes a pair of gears 16 and 17 adapted to be rotated at equal speeds in opposite directions when a particular unit is energized. As is more fully explained in Patent 2,293,299, shaft 20 has adjustably locked thereto central washer 21. Central washer 21 is provided with finger 22 and is adapted to be engaged by a number of loose washers 24 and 25 disposed on opposite sides of central washer 21. Washers 24 and 25 are each provided with fingers 26. Gears 16 and 17 are also provided with fingers 27. As disclosed in Patent 2,161,183, groups 24 and 25 have an equal number of washers 24 and 25 and are adapted to provide a lost-motion drive between gears 16 and 17, on the one hand, and central washer 21, on the other hand. The loose mounting of gears 16 and 17 and washers 24 and 25 may be provided by a sleeve construction as disclosed in said patent. When the lost motion is taken up on opposite sides of finger 22, gears 16 and 17 exert equal opposing forces, and the entire preselector unit becomes locked in a home position.

The locking of a preselector unit effectively turns shaft 20 through a desired angle, which angle may be as great as necessary and may be determined by the number of washers 24 and 25. Shaft 20 is coupled by gears 30 and 31 to load 13 and thus moves the load, in this particular case a condenser, to any desired preselected position.

A power drive between motor 19 and the preselector units may be established through gear trains. Thus, motor 19 has drive shaft 33 carrying gear 34. Gear 34 meshes with gear 35, this gear carrying small pinion 36 with it. Pinion 36 meshes with gear 37, which gear meshes with gear 38 for supplying power to all preselector units. Gear 38 has a coil spring 39 to transmit power for driving shaft 40 carrying drive gears 41 at spaced intervals along the shaft. One drive gear 41 is provided for each preselector unit and serves as the source of power for that unit.

Since all the preselector units are the same, only one will be described in detail. Meshing with gears 16 and 17 of each preselector unit are gears 43 and 44. Meshing with gear 44 is gear 46 mounted on bracket 47 pivotally mounted to move around the center of gear 44. All gears 44 are loose on frame rod 45, and brackets 47 may be loosely pivoted on rod 45. Gears 43 and 44 mesh with each other, as well as with gears 16 and 17.

Gear 46 may be moved by bracket 47 into engagement with gear 41. When this occurs, gear 41, as a source of power, will drive gear 44, which drives gears 43 and 17 simultaneously. Gear 43 drives gear 16. It is clear that gears 16 and 17 turn in opposite directions and, by proper choice of gear ratios, may be made to go at equal speeds. Spring 48 disposed between bracket 47 and the frame of the entire structure is adapted to pull bracket 47 down, so that gear 46 will engage with gear 41.

Referring back to the motor drive proper, gears 35, 36 and 37 are all mounted on bracket 50 pivotally mounted to move around the center of gear 34. The detailed bracket mounting is shown in Figure 8 and described later. The entire gear train between gear 34 and gear 38 is designed so that bracket 50 may have a limited movement around the center of gear 34 without disengagement of the gear train. Spring 51 normally biases bracket 50 in a down (counter-clockwise) position, as seen in Figure 9. When the preselection point has been reached and the motor and entire gear train locks, bracket 50 turns around gear 34 and takes up as much gear play as possible.

In order to control the tuner, a push-button system is provided. This push-button system has latch bar 55 slidably supported in the frame. Latch bar 55 has saw teeth 56 having the shape shown. Spring 57, disposed between washer 58 on the latch bar and the frame, tends to bias the latch bar in a locking position, this being in a right-hand position, as seen in Figures 1 and 5.

Cooperating with each saw tooth 56 is push-rod 60 having slots 61 and 62 disposed lengthwise of the rod. Latch bar 55 is threaded through slots 61. The locking tip of saw tooth 56 is adapted to engage in slots 62 and maintain rod 60 in a depressed on position. Felt washers 63 are provided for silencing.

Push-rods 60 are disposed in parallel relation and may simply consist of flat strips slidably mounted in a front frame plate. The end of each bar 60 is slotted at 64 and cooperates with frame bar 65 for supporting the push rod. Bar 65 may be grooved at 66 (Figure 6) so that slotted end 64 of the push-rod is restrained against side movement. The dimensions of slotted end 64 are such that the slotted end of push-rod 60 will always be guided by bar 65.

Each rod 60 is normally biased by spring 67, extending between the rod and frame cross bar 67a, to the off position shown in Figure 1, namely with the push-button out. Forked end 64 is provided with shoulder 68 against which end 70 of bracket 47 normally bears. Upon a push-button being moved in, end 70 will follow shoulder 68 and permit gear 46 to move into meshing condition.

Each push-rod 60 carries pivoted dog 72 having tooth 73 and ear 74. Spring 75 disposed between the body of rod 60 and ear 74 serves to bias dog 72 in a normal position. It will be noted (Figure 5) that ear 74 is bent to lie across the push-rod 60. Thus, dog 72 is normally biased to the position shown in Figures 3, 4, 6 and 9.

Pivotally disposed between main side plates 5a and 5b of the frame is a rocker assembly. This rocker assembly comprises pivot rod 76 upon which is pivotally mounted a generally flat rocker plate 77. Rocker plate 77, as is evident from Figures 3 to 7 inclusive in the drawing, is below push-rods 60 and extends upwardly and rearwardly from pivot rod 76.

It will be noted from the drawings that rocker plate 77 is so proportioned and disposed that free edge 77′ thereof may cooperate with tooth 73 of dog 72 in a manner to be described later. At any suitable portion of rocker plate 77, pin 78 is provided. This pin may be riveted to rocker plate 77 or secured in any other desired manner. Rigidly secured to frame 5, as shown in Figure 2 for example, is electric switch assembly 79. This switch assembly may have any desired construction, and in this particular instance comprises four spring metal leaves 80 to 83 inclusive forming two separate switches.

As shown here, the two switches are normally open but may be closed by pivotal movement of cross plate 77. This movement of the rocker plate around the pin to close the switch is evident from Figures 3, 6, 7 and 9.

Pivotally mounted on pivot pin 76 is bracket 85. This bracket has a general U shape, as is evident in the drawings (see Figures 2, 5 and 9 for example). Bracket 85 is biased by spring 87 anchored to a suitable point on the frame. Bracket 85 carries pins 88 at side arms 87 thereof, which pins extend sufficiently to engage rocker plate 77. Rocker plate 77 is below pins 88 so that, upon counter-clockwise rocking of bracket 85, as seen in Figure 3 for example, pins 88 will engage rocker plate 77 and tend to close the switches.

The normal position of bracket 85 is as shown in Figures 3 and 7. This normal position is such that rocker plate 77 does not close the switches.

Bracket 85 at the end adjacent frame side 5a has riveted thereto arm 90, this arm extending along the side of frame 5a generally upwardly (see Figure 8). Adapted to cooperate with arm 90 is finger 91 carried by bracket 50 (see Figures 8 and 9). Finger 91 is bent so that it extends through slot 92 in frame plate 5a. As is evident in Figure 8, bracket 50 has finger 93 extending through slot 94 in frame plate 5a. Since bracket 50 has circular flange 95 cooperating with aperture 96 in frame plate 5a for rotatively mounting the same, the two fingers are necessary to maintain the bracket in position against plate 5a. Aperture 96 is concentric with gear 34. It is understood that slots 92 and 94 are suitably proportioned to permit bracket 50 to move a limited angle. Finger 91 determines the rest position of bracket 85, and this position is as previously described.

One of the electric switches, here shown as leaves 82 and 83, is connected to circuit 100 going to motor 10. Assuming a live circuit, leaves 82 and 83 when closed will energize the motor and cause the same to rotate. The direction of rotation is counter-clockwise as seen in Figure 9. The other switch may be provided to silence a radio when the switch is closed.

The operation of the entire system is as follows. Initially, the push-button portion of the apparatus together with the switch will be in the condition shown in Figures 1 and 3. All push-buttons are off or out, and the electric switches will be open. Coupling gears 46 which complete a power drive from the motor to a particular preselector unit will be in an inactive position. Let it be assumed that each preselector unit, one of which is shown in Figure 10, is adjusted to select a particular setting for that individual unit. Each preselector unit will, of course, have its own individual setting.

As a push-button is depressed, the mechanism assumes the position in Figure 6. Thus, dog 72 for that particular push-rod moves forward and pushes rocker plate 77 down. With the push-button pressed in far enough, ear 73 rides over edge 77' of rocker plate 77. In this position, the electric switches are closed.

It will also be noted that, as a push-rod moves in, coupling gear 46 carried by bracket 47 is moved down into coupling engagement by the action of spring 49. Thus, as the motor starts turning in response to the closure of the switch, the various gears in the gear train between motor 10 and coupling gear 46 turn, and coupling gear 46 for one particular preselector unit may slip smoothly into mesh. As a push-button is operated, latch bar 55 is first moved over to the left (see Figures 1 and 5) so that serrated tip 56 is withdrawn from slot 61. At the bottom of the travel of a push-rod, serrated tip 56 will slip into slot 62 under the action of spring 57 (Figure 1). Thus, the push-button will be retained in a depressed on position by the latch bar.

With the motor turning, the mechanism rapidly reaches a home position. During this time, either or both of gears 16 and 17 of the preselector unit are turning in opposite directions. When a home position has been reached, gears 16 and 17 exert equal and opposing forces so that the motor stalls. When this occurs, the torque in the gear train causes bracket 50 and all the gears carried thereby to turn around the center of gear 34. This turning movement is in a clockwise direction, as seen in Figure 9.

Finger 91 moves upwardly, as seen in this figure, against the tension of spring 51. The resulting movement of this finger is communicated to arm 90 carried by bracket 85. Bracket 85 is rocked upwardly (clockwise as seen in Figure 6). Edge 85' of this bracket strikes the tail piece of dog 72 and causes the dog to rock clockwise to the position shown in Figure 7. Thus, ear 73 clears rocker plate 77. Rocker plate 77 may thereupon move clockwise around the pivot pin (Figure 7) to permit the switches to open. It is understood that the spring in the switches is sufficient to move the rocker plate. If desired, some spring bias to the rocker plate toward the open switch position may be provided. In any event, the switches and rocker plate are normally biased so that the switches are open. With the opening of the switch, the motor stops, and the gear train no longer has any torque. Bracket 50 is returned to its normal position by spring 51. At the same time, spring 87 forces bracket 85 down to its normal position. The limit defining the normal bottom position of bracket 85 will be determined by arms 90 and 91 together with slot 92 in frame side 5a. This position is such that bracket 85 does not force rocker plate 77 into switch closing position. Thus, the position shown in Figure 3 is normal for bracket 85 and rocker plate 77.

Assuming that another push-button is operated, the previously operated push-button in a depressed position is first released. Thus, as is clear in Figure 5, the slightest pressure on a push-rod first moves latch bar 55 to an unlocking position. Thus, the previously depressed push-rod will be released, and its coupling gear 46 will be uncoupled. The previous cycle of operations only occurs after the push-rod has unlocked all previously depressed push-rods.

It is understood that other types of preselector units may be used. Thus, the preselector units disclosed in Patents 2,293,299 and 2,293,355 could be used.

What is claimed is:

1. In combination, a preselector unit including a shaft, said unit having two oppositely driven members cooperating with a member rigid on said shaft and being adapted to lock when the shaft is in a home position, an electric motor and gear train and power coupling means for selectively supplying power to said unit, a switch for controlling said motor, means for mounting at least part of said gear train on a movable bracket, means for maintaining said bracket in a normal position when said motor is not stalled, said bracket being movable from its normal position by motor torque when said motor is stalled by said unit reaching a home position, means connecting said power coupling means and said electric switch so that when said coupling means is in a power transmitting condition said electric switch is closed, means for normally maintaining said coupling means in an inoperative position, manual means for rendering said coupling means operative and means responsive to bracket movement from said normal position for opening said switch, said coupling means becoming inoperative when said electric switch is opened upon bracket movement.

2. In combination, a plurality of preselector units including one shaft common to all said units, each preselector unit having two oppositely driven members cooperating with a member rigid on said shaft, said preselector unit being adapted to lock when the shaft is in a home position, each preselector unit including a coupling means normally in an uncoupled position, an electric motor including a circuit and switch normally open, a gear train between said motor and all of said coupling means, said gear train between said motor and coupling means including at least one gear mounted on a bracket, means for mounting said bracket to provide bracket movement over a limited range while maintaining the gear train in mesh, means for biasing said bracket to a normal position, said bracket being movable away from its normal position due to gear action when said motor exerts torque on a locked preselector unit, manual means for closing said motor switch and moving a selected coupling means into coupling position, and means controlled by the movement of said bracket from its normal position for opening said switch.

3. In combination, a plurality of preselector units including one shaft common to all said units, each preselector unit having two oppositely driven members cooperating with a member rigid on said shaft, said preselector unit being adapted to lock when the shaft is in a home position, each preselector unit including a coupling means normally in an uncoupled position, an electric motor including a circuit and switch normally open, a gear train between said motor and all of said coupling means, said gear train between said motor and coupling means including at least one gear mounted on a bracket, means for mounting said bracket to provide bracket movement over a limited range while maintaining the gear train in mesh, means for biasing said bracket to a normal position, said bracket being movable away from its normal position due to gear action when said motor exerts torque on a locked preselector unit, manual means including a lost motion connection for closing said switch and moving a coupling means into coupling position, and means cooperating with said bracket for operating on said lost motion means when said bracket moves to an off normal position for opening said switch.

4. In combination, a plurality of preselector units including a shaft for all of said units, each preselector unit being of the type having two oppositely driven members cooperating with a member rigid on said shaft, said unit being adapted to lock when the shaft is in a home position, each preselector unit including a coupling means, means for biasing each coupling means to a normally coupled position, an electric motor, a gear train between said motor and coupling means, a push-button mechanism having a push-button for each preselector unit, each push-button having an off and on position, means for biasing each push-button to an off position, means on each push-button for normally maintaining the coupling means of an associated preselector unit in an uncoupled position but permitting said coupling means to return to its biased coupling position when the associated push-button is in an on position, means for locking a push-button in its on position, an electric switch for controlling said motor, means for opening said motor circuit when all push-buttons are in an off position, means for closing said motor switch upon movement of a push-button from an off to an on position, and means for opening said motor switch after said motor has turned a preselector unit to a home position.

5. In combination, a plurality of preselector units including a shaft common to said units, each preselector unit having two oppositely driven members cooperating with a member coupled to said shaft, each unit being adapted to lock when the shaft is in a home position, each preselector unit having a coupling means, spring means for biasing said coupling means to a normal coupling position, an electric motor, a gear train between said motor and said coupling means, said gear train including at least one gear mounted on a bracket, means for mounting said bracket to permit bracket movement over a limited range while maintaining the gears in mesh, means for biasing said bracket to a normal position, said bracket being adapted to move away from its normal position when said motor exerts torque on a locked preselector unit, an electric switch for controlling said motor and having closed motor energizing and open de-energizing positions, means for normally maintaining said switch in an open condition, individual means for each selector unit for normally retaining a coupling means in an uncoupled position, manual means for closing said switch and simultaneously rendering the last-named means for the selected unit inoperative so that the coupling means may respond to its bias and move into coupling position, and means controlled by said bracket for opening said switch when said bracket moves to an off normal position.

6. In combination, a motor, a gear train for transmitting power from said motor, a switch having open and closed positions for controlling said motor, a plurality of preselector units including one shaft common to all of said units, each preselector unit having two oppositely driven members cooperating with a member rigid on said shaft, said preselector unit being adapted to lock when the shaft is in a home position, each preselector unit including a coupling gear, a bracket for supporting each coupling gear, a bracket for supporting part of said gear train, means for mounting said bracket so that the part of the gear train supported by the bracket may be displaced without throwing said gear train out of mesh, means for maintaining said bracket in a normal position, said bracket being movable away from its normal position when said motor is stalled, a push-button mechanism providing a push-rod for each preselector unit, each push-rod having a normal off position and having an on position, said push-rod mechanism including means for retaining a push-rod in its on position while releasing previously operated push-rods back to normal off positions, means cooperating between the push-rod for a preselector unit and the coupling gear for said preselector unit for disposing said coupling gear in a coupling position when the push-rod is in an on position and for disposing said coupling gear in an uncoupled position when said push-rod is in an off position, a first means for opening or closing said switch, a second means controlled by said bracket, means on each push-rod operative when a push-rod is in an on position to cooperate with said first-named means for closing said switch, means operatively connecting said second-named means and said bracket, said second-named means being movable with said bracket when said bracket moves away from its normal position upon motor stalling, and means responsive to the movement of said second-named means when motor stalling occurs to act on said first-named means and open said switch.

7. The structure of claim 6 wherein said first-named means and second-named means are both rockers.

8. The structure of claim 6 wherein each push-rod has a pivoted dog and wherein said second-named means acts on said dog when motor stalling occurs to release said first-named means from a switch closing position.

EDWARD J. MASTNEY.
JOHN H. WILLIAMS.

REFERENCES CITED

The following references are of record in the file of this patent:

UNITED STATES PATENTS

| Number | Name | Date |
|---|---|---|
| 2,005,122 | Young et al. | June 18, 1935 |
| 2,241,715 | Plensler et al. | May 13, 1911 |
| 2,293,299 | Mastney et al. | Aug. 18, 1942 |
| 2,411,617 | Elliott | Nov. 26, 1946 |
| 2,417,528 | Ten Cate et al. | Mar. 18, 1947 |